United States Patent

Chaumat et al.

[11] Patent Number: 5,836,505
[45] Date of Patent: Nov. 17, 1998

[54] JOINING BY BRAZING OF CERAMIC MATERIALS CONTAINING SILICON CARBIDE

[75] Inventors: Gilles Chaumat, Claix; Gisèle Coing-Boyat, Sassenage, both of France

[73] Assignee: Commissariat a l'Energie Atomique, Paris, France

[21] Appl. No.: 852,375

[22] Filed: May 7, 1997

Related U.S. Application Data

[60] Provisional application No. 60/032,756 Dec. 11, 1996.

[30] Foreign Application Priority Data

May 7, 1996 [FR] France ..................... 96 05708

[51] Int. Cl.$^6$ ................. B23K 35/30; B23K 103/16
[52] U.S. Cl. ............... 228/121; 228/248.1; 420/462; 420/578
[58] Field of Search ................. 228/121, 122.1, 228/124.1, 232, 233.2, 248.1; 420/462, 578, 590

[56] References Cited

U.S. PATENT DOCUMENTS 4,596,354  6/1986  Moorhead .................. 228/121
5,495,979  3/1996  Sastri et al. ................ 228/124.1

*Primary Examiner*—Samuel M. Heinrich
*Attorney, Agent, or Firm*—Oblon, Spivak, McClelland, Maier & Neustadt, P.C.

[57] ABSTRACT

The present invention relates to joining by brazing ceramic elements comprising SiC. The purpose of the invention is to provide a braze alloy which gives a brazed joint resistant to fluorine effluents and having controlled reactivity with SiC. This purpose is achieved using a braze alloy comprising Si and rhodium.

13 Claims, No Drawings

JOINING BY BRAZING OF CERAMIC MATERIALS CONTAINING SILICON CARBIDE

Full benefit of the filing date of U.S. Provisional Application Ser. No. 60/032,756, filed Dec. 11, 1996 is claimed pursuant to the provisions of 35 U.S.C. §119(e).

1. Technical Field

The present invention relates to joining by brazing of ceramic materials containing silicon carbide, offering very strong resistance to oxidation.

As for all technical ceramics in general, it is difficult to manufacture a structure of complex shape. It is therefore preferable to manufacture the structure of complex shape using ceramic elements of simple shape that are joined by brazing.

Silicon carbide SiC belongs to the family of non-oxide ceramics and offers physical and chemical properties of interest such as a long lifetime, high thermal conductivity, strong resistance to temperatures placing SiC in the category of refractory materials reaching as high as 1800° C., and good resistance to water corrosion and to oxidation even at high temperatures. This is the reason why silicon carbide is used in chemical engineering installations, in particular in the manufacture of large-scale industrial heat exchangers, and in energy engineering installations.

However, in chemical engineering installations, its use is very often restricted by joining problems as joints may be in contact with acid effluents containing hydrofluoric acid.

The compound used for joining elements in SiC ceramic must therefore not only offer the same physical and chemical properties as these elements, but must also be compatible with silicon carbide having good binding properties with silicon carbide to form a homogeneous, well-sealed joint.

Joining SiC ceramics by gluing is not possible, as glues are organic materials (organic resins) and age poorly at temperatures of over 100° C.

Also, joining by diffusion welding between two SiC substrates is impossible to achieve as the stability of silicon carbide lies in the region of temperatures below 1800° C.

Conventional joining techniques using a power beam with no filler alloy such as tungsten inert gas welding (TIG), welding by electronic bombardment (EB) or by laser cannot be used either as it is impossible to make silicon carbide melt directly without destroying it.

In the current state of the art, brazing is the technique used to carry out refractory joining of elements in SiC ceramic.

Brazing is a joining technique consisting in particular of joining ceramic elements using a filler alloy in liquid state having a melting temperature lower than that of the components to be joined and offering good wetting properties for the surfaces to be joined as the latter do not take part by melting in the joining operation.

Wetting capacity is the ability of a liquid to flow over the surface of a solid material. Wetting capacity is a measurable physical property giving an angle of junction between the liquid under consideration and the surface of the material with which the liquid is in contact. The angle of junction or wetting is lower the greater a liquid's wetting capacity for the material. Therefore perfect wetting capacity gives an angle $\alpha=0°$, imperfect wetting gives an angle $\alpha$ of between 0° and 90°, and zero wetting capacity gives a zero wetting angle $\alpha$ of more than 90°.

To ensure a homogenous, sealed joint between the ceramic elements at the interface of the braze alloy and said ceramic elements, it is essential that the braze alloy used has good wetting properties for SiC ceramic.

For SiC-SiC joining it is therefore necessary to use a stable braze alloy which resists against temperature rises, oxidation by air and fluorine effluents both at room temperature and at temperatures of over 50° C., having good wetting capacity and good mechanical properties.

Numerous studies have attempted to solve these different problems, in particular by using braze alloys comprising metals.

2. Prior art

It is known that ceramics containing silicon carbide are very reactive with most transition metals: Ni, Fe, Cu, Mn, Co, Cr, Pt, Au, Ag, Pd, Ti, Zr, Hf, etc. A braze alloy containing a high proportion of these elements reacts violently with silicon carbide creating numerous porosities and/or compounds defined as fragilizing such as carbides and silicides corresponding to the transition metals, such reaction taking place at temperatures from 700° C. upwards.

Therefore the document "Development of New Active Filler Metals for Joining Silicon Carbide and Nitride" E. LUGSCHEIDER AND W. TILLMANN DABS $6^{th}$ INTERNATIONAL CONFERENCE HIGH TECHNOLOGY JOINING—September 1991, describes the use of a ternary braze alloy Cu—Pt—Nb (copper—platinum—niobium) in which the purpose of Nb is to stabilise the braze alloy at a brazing temperature of 1100° C. However, although the reactivity between Nb and SiC is low, the ceramic is extensively decomposed at the joining point between the braze alloy/ceramic interface making the joint fragile.

Although this document mentions the use of precious metals to obtain joints resisting against oxidation, it only refers to such use of precious metals in braze alloys of ternary composition.

The document: "A REVIEW OF SILICON CARBIDE/METAL INTERACTIONS WITH RELEVANCE TO SILICON CARBIDE JOINING", B. H. RABIN (April 1991) EG & G IDAHO, INC., Idaho Falls, Id. 83415 is a study on the interactions between metals such as Ni, Fe, Ti, Cr, Al, Cu, Pd, Mo, W, V, Ta, Nb, Hf, Zr and silicon carbide at high temperatures.

This study was carried out with the purpose of understanding said interactions and of finding the most appropriate means of joining silicon carbide materials, such joints having to resist high temperatures and oxidation. Applying the results obtained by this study, this document describes the use of a metal filler material. Since Ni or Fe-based fillers appear to be too reactive with silicon carbide, this document recommends, to reduce such reactivity, adding silicon or carbon to the filler material. Alternately, with the same purpose in mind, this documents mentions the possibility of adding to the filler, in addition to the above-mentioned components, a precious metal such as Pd or Pt, but this document does not describe any application, composition or results concerning this type of filler material.

The preferred filler material of this document is a Ti-based material which gives a SiC-SiC joint with good mechanical properties at a temperature of up to 1000° C., but this joint is not stable and is very sensitive to oxidation.

Also, this document describes the use of a solid state weld using metals to join SiC-type ceramic materials. This joining using sold state welding is more resistant to high temperatures than braze joining, but it is very sensitive to oxidation.

Patent U.S. Pat. No. 3,813,759 relating to brazing of silicon carbide materials, claims the use of a braze alloy consisting of silicon and one or more metals. The metals concerned are Fe, Au, Ni, Pd, Pt, Cr and Ti and the braze alloy contains an atomic percentage of silicon of at least 5%.

However, this document describes more particularly the use of alloys of metals and silicon in which the silicon has an atomic percentage of over 50%. But these braze alloys rich in silicon are very sensitive to corrosion by oxidation and do not provide brazed joints resistant to a 50% hydrofluoric effluent (mixture of 40% hydrofluoric acid and nitric acid) or to solutions of boiling 40% hydrofluoric acid.

DISCLOSURE OF THE INVENTION

The purpose of the present invention is precisely to provide a new brazed joint which solves all the problems raised above, and a method of manufacture of said joint.

According to the invention this joining of ceramic elements comprising silicon carbide is made by means of a brazed joint formed of a braze alloy of silicon (Si) and rhodium (Rh) resistant to fluorine at temperatures of over 50° C.

It is specified that in this invention the term "fluorine resistant" means that the alloy resists against fluorides and all types of fluorine products such as fluorine effluents, hydrofluoric acid etc.

According to the invention, the atomic proportions of Si and Rh are chosen in such manner as to obtain alloys resisting against fluorides at temperatures of over 50° C. This result is surprising as known alloys with high silicon content such as those described in document U.S. Pat. No. 3,813,759 do not have this property.

In the braze alloy of the present invention, silicon represents an atomic percentage of between 40 and 60%, preferably 50 atomic % of said alloy.

The system used is therefore Si—Rh. For this system we found that it is necessary to use a braze alloy with a well-defined composition range having a minimum Si content in order to overcome problems of reactivity between the braze alloy metal and silicon carbide, and a maximum Si content in order to limit corrosion of the braze alloy by oxygen in the air and by fluorine effluents.

The method of joining ceramic elements comprising SiC according to the present invention comprises the stages of positioning a braze alloy of Si and Rh between the surfaces of the ceramic elements to be joined, and heating to a braze temperature of 1450° C. to 160° C. to obtain brazing.

Positioning the braze alloy between the surfaces to be joined may be carried out using several techniques, in particular enduction or coating of at least one of the surfaces by the braze alloy may be used.

Preferably, the braze alloy is placed in position by enduction of the surfaces to be joined using a suspension of braze alloy particles in a volatilizable binding agent at a temperature of less than 1000° C.

This suspension of braze alloy particles may be prepared by fusion of Si and Rh to obtain an alloy, cooling the alloy to obtain a solid braze alloy, grinding the solid braze alloy into powder form and mixing the powder and binding agent.

The silicon form used to prepare the braze in suspension form is silicon pieces.

The rhodium in filament form and the silicon are placed in a vessel, for example in alumina, and heated in a secondary vacuum to a temperature of between 1450° C. and 1600° C. Fusion is preferably obtained at 1500° C.

Heating is maintained for 5 minutes so that the different constituents can be melted and in order to obtain a homogeneous mixture. The homogeneous mixture is then cooled and fragile braze alloy blocks are obtained. These fragile braze alloy blocks are ground for example in a mortar into powder form whose grains have a diameter of between 0.05 and 0.1 mm.

The braze alloy in powder form thus obtained is mixed with a liquid binding agent for example of NICROBRAZ type in such manner as to create a suspension.

The liquid organic binding agents are chosen so that they are volatilized during heating up to brazing temperature, so that only the alloy of Si and Rh remains at brazing temperature.

According to a variant, the braze alloy may be applied by metallizing the SiC surfaces to be joined, followed by a cycle of thermal annealing.

Metallizing consists of directly applying the braze alloy to the Sic surfaces to be joined.

Depositing techniques for metallizing may be vapour phase depositing, spraying, thermal splitting after metallizing, chemical reduction, cathode "sputtering", evaporation, electrolysis etc.

Prior surface treatment of the ceramic elements to be joined is not necessary. However, it is referable to clean and dry the surfaces before coating them with the braze alloy.

Said surfaces are placed in contact with each other and placed in an oven for braze heating.

Heating may be carried out by various techniques such as laser, electron beam, induction and intermediate resistor heating.

Preferred heating is carried out using a resistor oven, operating under a vacuum or a neutral gas, as on an industrial level this technique is easy to implement.

Braze heating may be made following a cycle comprising a first heating stage and a second heating stage. The first heating stage at a temperature of 200° to 400° C., preferably at approximately 200° C., is conducted for a period of one hour. This first heating stage allows gas release from the braze alloy so that the final joint is more homogeneous and allows proper wetting of the two surfaces of ceramic elements to be joined.

The braze alloy is a Si—Rh alloy in which Si represents 40 to 60 atomic % of the alloy; the brazing temperature is between 1450° C. and 1600° C., preferably 1500° C.

Brazing is conducted under a secondary vacuum at a pressure of $10^{-2}$ Pa, this low pressure causing gas release from the braze alloy during brazing.

A joint of SiC/RhSi/SiC type is obtained.

The joint offers the advantage of being very resistant to corrosion by fluorine effluents even at temperatures of over 100° C. This resistance allows very for long periods of operation for installations comprising joints made according to this invention.

Also, this joint has the advantage of having a brazing temperature that is sufficiently high so that it may be subjected without being damaged to temperatures at which resins and organic glues cannot be used.

The braze alloy also has the advantage of being well adapted to ceramics containing silicon carbide from a chemical compatibility viewpoint as its reactivity is controlled.

Regarding wetting capacity, the wetting angle of the joint according to the invention is less than 30° which provides good filling between the joint and the surfaces of the ceramic elements to be joined.

Also, the mechanical properties of the joint are equivalent to the intrinsic mechanical properties of silicon carbide.

This joint also has the advantage of the offering very good resistance to oxidation in air up to temperatures of over 1000° C.

Compositions of the braze alloy according to the present invention are little sensitive to brazing operating conditions owing to the controlled reactivity at the braze joint/SiC interface.

An additional advantage provided by the present invention is that joining is simple to perform. No surface treatment is required of the silicon carbide elements, brazing being done directly.

Also, unlike conventional reactive braze alloys used for ceramics, the quality of the atmosphere of the brazing oven is not critical for the braze joint of the invention.

Therefore, industrial ovens of average quality, that is to say with which the type of atmosphere cannot be precisely controlled, may be used. Ovens of average quality are ovens which cannot obtain a better vacuum than $10^{-1}$ Pa or ovens using a standard neutral gas containing many impurities including water and oxygen.

In our case, these ovens of average quality can be used as brazing using the method of the present invention tolerates even a non-zero partial pressure of oxygen, for example of $10^{-1}$ Pa of oxygen.

Other characteristics and advantages of the invention shall be better seen on reading the following example which is evidently given for guidance purposes and is non-restrictive.

EXAMPLE

This example concerns a method for joining SiC ceramic elements using a Si—Rh braze alloy.

A braze alloy comprising atomic percentages of 50% Rh and 50% Si is formed using rhodium in filament form and silicon in piece form.

The rhodium and silicon are placed in an alumina vessel and heated under a vacuum to 1500° C. for 5 minutes in order to melt the two components and synthesise the braze alloy.

Fragile pieces of braze alloy are obtained which are ground in a mortar into powder form whose grains have a diameter of 0.05 to 0.1 mm.

The braze alloy powder is then mixed with a liquid binding agent, cement of NICROBRAZ type, in order to obtain a braze alloy suspension.

The two surfaces of the silicon carbide elements to be joined by brazing are coated with this suspension after cleaning and drying.

The two coated surfaces, ready for brazing are brought into contact and placed in an oven under a secondary vacuum to undergo a first and second stage of heating:

a first stage of heating at 300° C. for 1 hour to release gas in the braze alloy
  a second heating stage for brazing under the following operating conditions
  brazing temperature 1500° C.
  brazing time: 5 minutes, and
  secondary vacuum: $10^{-2}$ Pa.

The SiC/RhSi/SiC brazed joint obtained is then cooled.

This brazed joint is then subjected to a corrosion resistance test with hydrofluoric acid.

The SiC/RhSi/SiC joint is weighed and placed in an autoclave containing a 40% solution of hydrofluoric acid at a temperature of 100° C. for a period of 1000 hours.

Weighing after this corrosion test shows no mass loss of the SiC/RhSi/SiC joint.

Metallographic analysis does not show any chemical attack of this joint which may have been induced by this fluorine bath.

This example, without being restrictive, well illustrates the high qualities of the brazed joint of the invention intended for joining SiC ceramics. Therefore the brazed joint of the present invention offers all the required qualities for SiC/SiC joining, in particular very good mechanical properties and high thermal stability, and solves all the problems raised by the prior art. The brazed joint of the present invention offers in particular good adhesion with the SiC ceramic surfaces to be joined (the wetting angle is less than 30°) and has the advantage of being highly corrosion resistant against fluorine effluents.

Also, the joining of the present invention has the advantage of being very easy to perform.

We claim:

1. Joining of ceramic elements comprising SiC, by means of a brazed joint, characterized in that the brazed joint is formed of a braze alloy of Si and Rh, resistant to fluorine at temperatures of over 50° C.

2. Joining in accordance with claim 1, characterised in that the alloy is a Si—Rh alloy, in which Si represents 40 to 60 atomic % of said alloy.

3. Joining in accordance with claim 2, characterised in that Si represents 50 atomic % of said alloy.

4. Method for joining ceramic elements comprising SiC, characterized in that it comprises the stages of positioning the braze alloy of Si and Rh between the surfaces of the ceramic elements to be joined, and heating to a brazing temperature of 1450° C. to 1600° C. to obtain brazing.

5. Method for manufacturing a joint in accordance with claim 4, characterized in that the braze alloy is placed in position by surface enduction by means of a suspension of braze alloy particles in a volatilizable binding agent at a temperature of less than 10000° C.

6. Method in accordance with claim 5, characterized in that the suspension is prepared by fusion of silicon and rhodium in such manner as to obtain an alloy, cooling the alloy to obtain a solid braze alloy, grinding the solid braze alloy into powder form and mixing the powder with the binding agent.

7. Method in accordance with claim 6, characterized in that fusion is carried out under a secondary vacuum at a temperature of between 450° and 1600° C.

8. Method in accordance with claim 7, characterized in that the braze powder has a grain diameter of 0.05 to 0.1 mm.

9. Method in accordance with claim 4, characterized in that the braze alloy is a Si—Rh alloy in which Si represents 40 to 60 atomic %.

10. Method of manufacturing a joint in accordance with claim 4, characterized in that heating is carried out following a cycle comprising a first heating stage at a temperature of 200° to 400° C., and a second heating stage at brazing temperature.

11. Method of manufacturing a joint in accordance with claim 9, characterized in that heating is carried out following a cycle comprising a first heating stage at a temperature of 200° to 400° C., and a second heating stage at brazing temperature.

12. Method in accordance with claim 10, characterized in that the brazing temperature is 1450° to 1600° C.

13. Method in accordance with claim 11, characterized in that the brazing temperature is 1450° to 1600° C.

* * * * *